United States Patent
Sudo

(10) Patent No.: US 12,514,803 B2
(45) Date of Patent: Jan. 6, 2026

(54) DEODORANT

(71) Applicant: TOSOH CORPORATION, Shunan (JP)

(72) Inventor: Yukinori Sudo, Shunan (JP)

(73) Assignee: TOSOH CORPORATION, Shunan (JP)

(*) Notice: Subject to any disclaimer, the term of this patent is extended or adjusted under 35 U.S.C. 154(b) by 400 days.

(21) Appl. No.: 17/760,108

(22) PCT Filed: Feb. 3, 2021

(86) PCT No.: PCT/JP2021/004001
§ 371 (c)(1),
(2) Date: Aug. 4, 2022

(87) PCT Pub. No.: WO2021/157630
PCT Pub. Date: Aug. 12, 2021

(65) Prior Publication Data
US 2023/0059218 A1    Feb. 23, 2023

(30) Foreign Application Priority Data

Feb. 5, 2020  (JP) ................. 2020-017851
Jul. 6, 2020   (JP) ................. 2020-116634

(51) Int. Cl.
| | | |
|---|---|---|
| A61K 8/44 | (2006.01) | |
| A61K 8/41 | (2006.01) | |
| A61K 8/49 | (2006.01) | |
| A61L 9/01 | (2006.01) | |
| A61L 9/012 | (2006.01) | |
| A61L 9/014 | (2006.01) | |
| A61L 101/36 | (2006.01) | |
| A61Q 15/00 | (2006.01) | |

(52) U.S. Cl.
CPC ............ *A61K 8/44* (2013.01); *A61K 8/41* (2013.01); *A61K 8/494* (2013.01); *A61L 9/01* (2013.01); *A61L 9/012* (2013.01); *A61L 9/014* (2013.01); *A61Q 15/00* (2013.01); *A61L 2101/36* (2020.08)

(58) Field of Classification Search
None
See application file for complete search history.

(56) References Cited

U.S. PATENT DOCUMENTS

| | | |
|---|---|---|
| 3,493,467 A | 2/1970 | Drell et al. |
| 5,112,741 A | 5/1992 | Palmer et al. |
| 5,206,204 A | 4/1993 | Tsutsumi et al. |
| 5,213,791 A | 5/1993 | Lyon et al. |
| 5,278,225 A | 1/1994 | Kohlhammer et al. |
| 7,790,467 B1 | 9/2010 | Massick |
| 11,439,721 B2 * | 9/2022 | Sudo ............ B01D 53/72 |
| 2006/0275913 A1 | 12/2006 | Kitasaka et al. |
| 2011/0070182 A1 | 3/2011 | Williams et al. |
| 2016/0220952 A1 | 8/2016 | Whitehead et al. |
| 2020/0061225 A1 | 2/2020 | Sudo et al. |

FOREIGN PATENT DOCUMENTS

| | | | | |
|---|---|---|---|---|
| CN | 107441541 A | * | 12/2017 | ............ A61L 9/01 |
| JP | 4-358536 A | | 12/1992 | |
| JP | 11-4879 A | | 1/1999 | |
| JP | 2003-287480 A | | 10/2003 | |
| JP | 2005-233613 A | | 9/2005 | |
| JP | 2007-333692 A | | 12/2007 | |
| JP | 2010-46665 A | | 3/2010 | |
| JP | 2011-173070 A | | 9/2011 | |
| JP | 2012-120708 A | | 6/2012 | |
| JP | 2013-504697 A | | 2/2013 | |
| JP | 2014-142197 A | | 8/2014 | |
| JP | 2017165936 A | * | 9/2017 | |
| JP | 2018-3196 A | | 1/2018 | |
| JP | 2018-108360 A | | 7/2018 | |
| JP | 2018-114463 A | | 7/2018 | |
| JP | 2020-6158 A | | 1/2020 | |
| JP | 2020-6159 A | | 1/2020 | |
| JP | 2020-6160 A | | 1/2020 | |
| JP | 2020-6161 A | | 1/2020 | |
| JP | 2020-6364 A | | 1/2020 | |
| JP | 2020-143223 A | | 9/2020 | |
| JP | 2020-158452 A | | 10/2020 | |
| WO | WO 01/81367 A2 | | 11/2001 | |
| WO | WO 2011/034765 A2 | | 3/2011 | |
| WO | WO 2012/137979 A1 | | 10/2012 | |
| WO | WO-2018124208 A1 | * | 7/2018 | ............ A61L 9/01 |

OTHER PUBLICATIONS

English translation for JP-2017165936-A (2017). (Year: 2017).*
English translation for CN-107441541-A (2017). (Year: 2017).*
U.S. Appl. No. 16/466,232, filed Jun. 3, 2019, 2020/0061225 A1, Yukinori Sudo et al.
International Search Report issued Mar. 23, 2021 in PCT/JP2021/004001, filed on Feb. 3, 2021, 2 pages.
Tamas et al. "The Mass Spectra of Some α-Aminooxy Acids", Organic Mass Spectrometry, vol. 9, 1974, pp. 672-678.
Amrhein et al. "α-Aminooxy-β-Phenylpropionic Acid—A Potent Inhibitor of L-Phenylalanine Ammonia-Lyase in Vitro and in Vivo", Plant Science Letters, vol. 8, 1977, pp. 313-317.

(Continued)

*Primary Examiner* — Sin J Lee

(74) *Attorney, Agent, or Firm* — Oblon, McClelland, Maier & Neustadt, L.L.P.

(57) ABSTRACT

To provide an agent for rapidly capturing aldehydes and carboxylic acids even in a neutral range in the vicinity of pH=7.

Against aldehydes and carboxylic acids, a deodorant comprising a carboxy group-containing O-substituted monohydroxylamine or a chemically acceptable salt thereof, and an amine, is used.

12 Claims, No Drawings

(56)     References Cited

OTHER PUBLICATIONS

STN-Registry database CAS 1784926-91-5, 1 page.
STN-Registry database CAS 2211-12-3, 1 page.

* cited by examiner

DEODORANT

CROSS-REFERENCE TO RELATED APPLICATIONS

The present application is a 35 U.S.C. § 371 national stage patent application of International patent application PCT/JP2021/004001, filed on Feb. 3, 2021, which is based on and claims the benefits of priority to Japanese Application No. 2020-017851, filed on Feb. 5, 2020 and Japanese Application No. 2020-116634, filed on Jul. 6, 2020. The entire contents of all of the above applications are incorporated herein by reference.

TECHNICAL FIELD

The present invention relates to a deodorant.

BACKGROUND ART

Aldehydes such as acetaldehyde and formaldehyde are typical odorants in the living environment and cause unpleasant odors even at low concentrations due to their extremely low odor threshold. These aldehydes are generated indoors and in automobiles from synthetic resins, plywood, cigarette smoke, etc., and are known to cause sick building syndrome and sick car syndrome. These aldehydes are also suspected to be carcinogenic, and daily exposure to them poses a risk to human health. Therefore, the Ministry of Health, Labor, and Welfare of Japan has set guideline indoor concentration values of 0.03 ppm or less for acetaldehyde and 0.08 ppm or less for formaldehyde. Therefore, a means to quickly and continuously remove aldehydes is required.

Since low-grade aldehydes such as acetaldehyde and formaldehyde have low boiling points, inorganic porous materials such as silica gel and activated carbon, which are commonly used as deodorants, have low capture efficiency. Therefore, methods of capturing aldehydes by chemical reaction of aldehydes with deodorants consisting of hydrazine derivatives, amines, amino acids, or urea derivatives have been disclosed (see, for example, Patent Documents 1 to 3).

However, the methods described in these Patent Documents had problems such that capture efficiency was insufficient, the deodorants themselves became odor sources, or aldehydes were re-released over time even if once captured. Further, in a case where the deodorants described in these Patent Documents are used in residences or automobiles for the purpose of preventing sick building syndrome or sick car syndrome, the performance of the deodorants deteriorates because these places become hot during the summer, etc.

Further, in a case where deodorants are applied to automobile interior materials, etc., the acidic or basic nature of the deodorants may cause corrosion problems in products and metals used in the manufacturing process.

Furthermore, aldehydes are easily oxidized to carboxylic acids in the air, and factory exhaust gases containing aldehydes may also contain carboxylic acids produced by the oxidation of the aldehydes. In such cases, carboxylic acids are also strong odorants and must be deodorized together with aldehydes.

PRIOR ART DOCUMENTS

Patent Documents

Patent Document 1: JP-A-H4-358536
Patent Document 2: JP-A-H11-4879
Patent Document 3: JP-A-2012-120708

DISCLOSURE OF INVENTION

Technical Problem

The present invention was made in view of the background art described above, the object of which is to provide a deodorant which rapidly captures aldehydes and carboxylic acids even in a neutral range in the vicinity of pH=7.

Solution to Problem

As a result of diligent study to solve the above problem, the present inventors have found that a deodorant comprising a specific carboxy group-containing O-substituted monohydroxylamine or a chemically acceptable salt thereof, and an amine, rapidly captures aldehydes and carboxylic acids even in the neutral range in the vicinity of pH=7, and thus have accomplished the present invention.

That is, the present invention resides in the following [1] to [8].

[1] A deodorant characterized by comprising a carboxy group-containing O-substituted monohydroxylamine or a chemically acceptable salt thereof, and an amine.

[2] The deodorant according to [1], characterized in that the carboxy group-containing O-substituted monohydroxylamine is a compound represented by the following formula (1):

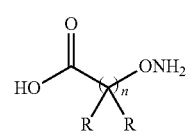

(in the formula, R represents a hydrogen atom, a $C_{1-18}$ alkyl group, a $C_{6-14}$ aryl group or a $C_{7-15}$ arylalkyl group, and n represents an integer of from 1 to 6, wherein a plurality of R may be identical or different from each other.)

[3] The deodorant according to [2], characterized in that in the formula (1), R is any of a hydrogen atom, a methyl group, an ethyl group, a propyl group, an isopropyl group, a butyl group, an isobutyl group, a sec-butyl group, a tert-butyl group, a benzyl group and a phenyl group.

[4] The deodorant according to any one of [1] to [3], characterized in that the amine is at least one member selected from the group consisting of polyethyleneimine, diethanolamine, triethanolamine, tris-hydroxymethylaminomethane, ethylenediamine-N, N, N', N'-tetraethanol, piperazine, 1,4-piperazine diethanol, 1-(2,3-dihydroxypropyl)piperazine and 2-hydroxymethyltriethylenediamine.

[5] The deodorant according to any one of [1] to [4], characterized in that it further comprises a solvent, and its pH range is from 5 to 9.

[6] A deodorizing method characterized by using the deodorant as defined in any one of [1] to [5] to remove odorants.

[7] The deodorizing method according to [6], characterized in that the odorants are aldehydes.

[8] The deodorizing method according to [6], characterized in that the odorants are carboxylic acids.

Advantageous Effects of Invention

The deodorant of the present invention rapidly and persistently captures aldehydes and carboxylic acids. As a result, the odor derived from aldehydes and carboxylic acids can be reduced, whereby it is possible to improve the human living environment.

DESCRIPTION OF EMBODIMENTS

The deodorant of the present invention is characterized by comprising a carboxy group-containing O-substituted monohydroxylamine or a chemically acceptable salt thereof, and an amine.

In the carboxy group-containing O-substituted monohydroxylamine represented by the above formula (1), R represents a hydrogen atom, a $C_{1-18}$ alkyl group, a $C_{6-14}$ aryl group or a $C_{7-15}$ arylalkyl group. n represents an integer of from 1 to 6. A plurality of R may be identical or different from each other.

The $C_{1-18}$ alkyl group may be a linear, branched or cyclic alkyl group, and is not particularly limited, but it may, for example, be a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group (cetyl group), a heptadecyl group, an octadecyl group (stearyl group), an oleyl group, an elaidyl group, an isopropyl group, an isobutyl group, a sec-butyl group, a tert-butyl group, a 3-methylbutyl group, a 2,2-dimethylpropyl group, a 1,1-dimethylpropyl group, a 2-ethylhexyl group, a cyclopropyl group, a cyclobutyl group, a cyclopentyl group, a cyclohexyl group, a cycloheptyl group, a cyclooctyl group, a cyclononyl group, a cyclodecyl group, etc.

The $C_{6-14}$ aryl group is not particularly limited, but it may, for example, be a phenyl group, a naphthyl group, an anthryl group, a tolyl group, a xylyl group, a cumenyl group, a vinylphenyl group, a biphenylyl group, a phenanthryl group, etc.

The $C_{7-15}$ arylalkyl group is not particularly limited, but it may, for example, be a benzyl group, a phenylethyl group, a phenylpropyl group, a naphthylmethyl group, an anthrylmethyl group, a tolylmethyl group, a xylylmethyl group, a cumenylmethyl group, a vinylphenylmethyl group, a biphenylmethyl group, a phenanthrylmethyl group, etc.

Among these, a carboxy group-containing O-substituted monohydroxylamine of the formula (1) in which R is any of a hydrogen atom, a methyl group, an ethyl group, a propyl group, an isopropyl group, a butyl group, an isobutyl group, a sec-butyl group, a tert-butyl group, a benzyl group and a phenyl group, is particularly preferred.

Hydroxylamino groups in the above carboxy group-containing O-substituted monohydroxylamines may be partially or entirely in the form of a chemically acceptable salt with an inorganic or organic acid. The type of the salt is not particularly limited, but may, for example, be an inorganic acid salt such as a hydrochloride, a hydrobromide, a perchlorate, a silicate, a tetrafluoroborate, a hexafluorophosphate, a sulfate, a nitrate or a phosphate, or an organic acid salt such as an acetate, a citrate, a fumarate, a maleate, a trifluoromethanesulfonate, a trifluoroacetate, a benzoate or a tosylate, and from a viewpoint of lower cost, an inorganic acid salt is preferred, and a hydrochloride is more preferred.

Further, the carboxy group in the above carboxy group-containing O-substituted monohydroxylamine may also form an intramolecular salt with an intramolecular hydroxylamino group.

The amine to be contained in the deodorant of the present invention is not particularly limited, but it may, for example, be polyethyleneimine, ethanolamine, diethanolamine, triethanolamine, tris-hydroxymethylaminomethane, ethylenediamine, diethylenetriamine, triethylenediamine, triethylenetetramine, tetraethylenepentamine, pentaethylenehexamine, ethylenediamine-N,N,N',N'-tetraethanol, 1,4-piperazine diethanol, 1-(2,3-dihydroxypropyl)piperazine, 2-hydroxymethyltriethylenediamine, piperazine, N-(2-aminoethyl)piperazine, etc.

From such a viewpoint that the odor of the deodorant itself should be low, among the above amines, a high boiling point amine, such as a polyamine such as polyethyleneimine, or a hydroxy group-containing amine, such as diethanolamine, triethanolamine, tris-hydroxymethylaminomethane, ethylene diamine-N, N, N', N'-tetraethanol, 1,4-piperazine diethanol, 1-(2,3-dihydroxypropyl)piperazine or 2-hydroxymethyltriethylenediamine, is particularly preferred.

Polyethyleneimine is preferably one having a molecular weight of 10,000 or more, since odor and toxicity to the human body tend to decrease with increasing molecular weight.

The deodorant of the present invention may be used in any optional form depending on the purpose and application. For example, a carboxy group-containing O-substituted monohydroxylamine or a chemically acceptable salt thereof, and an amine (hereinafter referred to as "the carboxy group-containing O-substituted monohydroxylamine and the amine") may be dissolved in an optional solvent and used as a liquid deodorant, or the carboxy group-containing O-substituted monohydroxylamine and the amine, or the aforementioned liquid deodorant may be supported on any optional carrier and used as a solid deodorant.

The amount of the carboxy group-containing O-substituted monohydroxylamine and the amine dissolved in the solvent at the time of preparing the liquid deodorant of the present invention may be optionally adjusted depending on the purpose and is not particularly limited, but the range of from 0.01 to 30 wt % is preferred, and the range of from 0.1 to 10 wt % is more preferred.

The solvent for dissolving the carboxy group-containing O-substituted monohydroxylamine and the amine at the time of preparing the liquid deodorant of the present invention, is not particularly limited, but may, for example, be water, methanol, ethanol, toluene, etc. Among them, water is particularly preferred because it is inexpensive and harmless to the human body.

The pH of the liquid deodorant is preferably in the range of from 5 to 9 in order to avoid corrosion of a product to be used or a metal to be used during its production process.

The weight ratio of the carboxy group-containing O-substituted monohydroxylamine to the amine in the deodorant of the present invention is preferably in such a weight ratio range that the pH at the time when made into a liquid deodorant would be in the range of from 5 to 9. For example, if the carboxy group-containing O-substituted monohydroxylamine is aminooxyacetic acid and the amine is polyethyleneimine (amine value=18 mmol/g), to 100 parts by weight of the aminooxyacetic acid, the parts by weight of the polyethyleneimine is generally in the range of from 30 to 170.

As the carrier to support the carboxy group-containing O-substituted monohydroxylamine and the amine at the time of preparing the solid deodorant of the present invention, any carrier may be used without any particular restriction so long as it is water-insoluble. For example, as a polymer carrier, a styrene polymer such as polystyrene, cross-linked polystyrene or the like, a polyolefin such as polyethylene, polypropylene or the like, a poly(halogenated olefin) such as polyvinyl chloride, polytetrafluoroethylene or the like, a nitrile polymer such as polyacrylonitrile or the like, a (meth)acrylic polymer such as polymethyl methacrylate, polyethyl acrylate or the like, a high molecular weight polysaccharide such as cellulose, agarose, dextran or the like, and as an inorganic carrier, activated carbon, silica gel, diatomaceous earth, hydroxyapatite, alumina, titanium oxide, magnesia, polysiloxane or the like, may be mentioned.

Here, crosslinked polystyrene is one composed mainly of a crosslinked copolymer of a monovinyl aromatic compound such as styrene, vinyltoluene, vinylxylene, vinylnaphthalene or the like, and a polyvinyl aromatic compound such as divinylbenzene, divinyltoluene, divinylxylene, divinylnaphthalene, trivinylbenzene, bisvinyl diphenyl, bisvinyl phenyl ethane or the like, and to such a copolymer, a methacrylic ester, such as glycerol methacrylate, ethylene glycol dimethacrylate or the like, may be copolymerized.

The shape of the carrier to be used in the preparation of the solid deodorant of the present invention is not particularly limited, but shapes to be commonly used as separation base materials, such as spherical (e.g. spherical particles), particulate, fibrous, granular, monolithic columns, hollow fiber, membranous (e.g. flat membrane), etc. are available. Among them, spherical, membranous, particulate, granular or fibrous ones are preferred. Spherical, particulate or granular carriers are particularly preferred, since their volume can be freely set when used in column or batch methods.

The particle size of spherical, particulate or granular carrier is usually in the range of from 1 μm to 10 mm in average particle size, and the range of from 2 μm to 1 mm is preferred.

The carrier to be used in the preparation of the solid deodorant of the present invention may be porous or non-porous. The average pore size of the porous carrier may usually be from 1 nm to 1 μm, and from the viewpoint of the deodorant speed, the range of from 1 nm to 300 nm is preferred.

The method for preparing the solid deodorant of the present invention is not particularly limited, but, for example, a method of letting the liquid deodorant of the present invention, or the carboxy group-containing O-substituted monohydroxylamine and the amine, be physically adsorbed and fixed on a carrier, may be mentioned.

The method of letting the carboxy group-containing O-substituted monohydroxylamine and the amine be physically adsorbed and fixed, is not particularly limited, but, for example, a method may be mentioned, in which the carboxy group-containing O-substituted monohydroxylamine and the amine are dissolved in a solvent such as water, then the above-mentioned carrier is added to let the carboxy group-containing O-substituted monohydroxylamine and the amine be impregnated in the carrier, and further the solvent is removed.

The amount of the carboxy group-containing O-substituted monohydroxylamine and the amine supported on the carrier, may optionally be adjusted depending on the purpose and is not particularly limited, but, the range of from 0.01 to 30 wt % is preferred, and the range of from 0.1 to 10 wt % is more preferred.

EXAMPLES

In the following, the present invention will be described in detail, but the present invention should not to be construed as limited to these Examples.

As polyethyleneimine, Epomin P-1000 (manufactured by Nippon Shokubai Co., Ltd., molecular weight 70,000) was used.

Further, with respect to aldehydes, the following abbreviations were used.

Formaldehyde=FA, acetaldehyde=AA, propionaldehyde=PA, butylaldehyde=BA, valeraldehyde=VA, isovaleraldehyde=i-VA Reference Example 1

A urethane foam (10×10×4 cm) was sealed in a Tedlar bag, depressurized and degassed, and then filled with 5 L of nitrogen gas. After being left to stand still for 2 hours at 65° C., the gas in the Tedlar bag was permitted to be adsorbed on a 2,4-dinitrophenylhydrazine (DNPH)-loaded cartridge (product name: PreSep-C DNPH, manufactured by Wako Pure Chemical Industries). From this cartridge, DNPH-aldehyde condensate was eluted (eluent=acetonitrile), and the DNPH-aldehyde condensate in the eluate was quantified by liquid chromatography (Device name: Agilent 1220 Infinity LC, manufactured by Agilent Technologies, Inc.) to calculate the released AA concentration, and as a result, the AA concentration was 0.29 mg/m$^3$.

Capture Test of Aldehyde Derived from Urethane Foam Using Liquid Deodorant

Example 1

As a liquid deodorant, an aqueous solution (pH=7) containing 3 wt % of aminooxyacetic acid and 3 wt % of polyethyleneimine, was prepared. This liquid deodorant was applied to each side of a urethane foam (10 cm×10 cm×4 cm) at a rate of 20 g/m$^2$ and allowed to dry at room temperature for 24 hours. This urethane foam was sealed in a Tedlar bag, degassed under reduced pressure, and then, 5 L of nitrogen gas was injected. After being left to stand still at 65° C. for 2 hours, the aldehyde concentration in the Tedlar bag was quantified in the same manner as in Reference Example. Further, the AA capture rate was calculated from the following formula, based on the AA release concentration (0.29 mg/m$^3$) in Reference Example 1.

Capture rate[%]={(0.29−residual concentration])/ 0.29}×100.

Example 2

Carried out in the same manner as in Example 1, except that as the liquid deodorant, an aqueous solution (pH=5) containing 3 wt % of aminooxyacetic acid and 2 wt % of polyethyleneimine, was used.

Example 3

Carried out in the same manner as in Example 1, except that as the liquid deodorant, an aqueous solution (pH=7) containing 3 wt % of aminooxyacetic acid and 4 wt % of tris-hydroxymethylaminomethane, was used.

Comparative Example 1

Carried out in the same manner as in Example 1, except that as the liquid deodorant, an aqueous solution (pH=8) containing 5 wt % of adipic acid dihydrazide, was used.

Comparative Example 2

Carried out in the same manner as in Example 1, except that as the liquid deodorant, an aqueous solution (pH=10) containing 3 wt % of polyethyleneimine, was used.

Comparative Example 3

Carried out in the same manner as in Example 1, except that as the liquid deodorant, an aqueous solution (pH=7) containing 3 wt % of aminooxyacetic acid and 0.6 wt % of sodium hydroxide, was used.

Comparative Example 4

Carried out in the same manner as in Example 1, except that as the liquid deodorant, an aqueous solution (pH=7) containing 3 wt % of polyethyleneimine and 0.2 wt % of hydrogen chloride, was used.

The results in Examples 1 to 3 and Comparative Examples 1 to 4 are shown in Table 1. As is evident from Table 1, the deodorants of the present invention showed higher aldehyde capturing performance as compared to conventional deodorants. Further, in a case where aminooxyacetic acid or polyethyleneimine was simply neutralized with hydrochloric acid or sodium hydroxide, the aldehyde capture performance was low.

TABLE 1

| | Liquid deodorant | | AA capture |
|---|---|---|---|
| | Composition [wt %] | pH | rate [%] |
| Ex. 1 | Aminooxyacetic acid [3], polyethyleneimine [3], water [94] | 7 | 95 |
| Ex. 2 | Aminooxyacetic acid [3], polyethyleneimine [2], water [95] | 5 | 95 |
| Ex. 3 | Aminooxyacetic acid [3], tris-hydroxymethylaminomethane [4], water [93] | 7 | 93 |
| Comp. Ex. 1 | Adipic acid dihydrazide [5], water [95] | 8 | <5 |
| Comp. Ex. 2 | Polyethyleneimine [3], water [97] | 10 | 66 |
| Comp. Ex. 3 | Aminooxyacetic acid [3], sodium hydroxide [0.6], water [96.4] | 7 | <5 |
| Comp. Ex. 4 | Polyethyleneimine [3], hydrogen chloride [0.2], water [96.8] | 7 | <5 |

Capture Test of Aldehyde Using Solid Deodorant

Example 4

0.2 g of the liquid deodorant prepared in Example 1 was dropped onto cotton cloth (10×10 cm) and further dried at 60° C. for 1 hour to prepare a solid deodorant. This solid deodorant was sealed in a Tedlar bag and degassed under reduced pressure, and then 1 L of a mixed aldehyde gas (component concentrations: FA=70 mg/m$^3$, AA=96 mg/m$^3$, PA=92 mg/m$^3$, BA=84 mg/m$^3$, VA=86 mg/m$^3$, i-VA=90 mg/m$^3$) was injected. After being left to stand at room temperature for 2 hours, the aldehyde concentration in the Tedlar bag was quantified in the same manner as in Reference Example. Further, the aldehyde capture rate was calculated from the following formula.

Capture rate[%]={(initial concentration−remaining concentration)/initial concentration}×100.

Example 5

Carried out in the same manner as in Example 4, except that in the preparation of the solid deodorant, the liquid deodorant prepared in Example 3 was used.

Example 6

Carried out in the same manner as in Example 4, except that in the preparation of the solid deodorant, an aqueous solution (pH=7) containing 3 wt % of aminooxyacetic acid and 5 wt % of triethanolamine, was used as the liquid deodorant.

Example 7

Carried out in the same manner as in Example 4, except that in the preparation of the solid deodorant, an aqueous solution (pH=7) containing 3 wt % of aminooxyacetic acid and 4 wt % of ethylenediamine-N,N,N',N'-tetraethanol, was used as the liquid deodorant.

Example 8

Carried out in the same manner as in Example 4, except that in the preparation of the solid deodorant, an aqueous solution (pH=7) containing 3 wt % of aminooxyacetic acid and 6 wt % of 1,4-piperazine diethanol, was used as the liquid deodorant.

Example 9

Carried out in the same manner as in Example 4, except that in the preparation of the solid deodorant, an aqueous solution (pH=7) containing 3 wt % of aminooxyacetic acid and 5 wt % of 1-(2,3-dihydroxypropyl)piperazine, was used as the liquid deodorant.

Example 10

Carried out in the same manner as in Example 4, except that in the preparation of the solid deodorant, an aqueous solution (pH=7) containing 3 wt % of aminooxyacetic acid and 4 wt % of 2-hydroxymethyltriethylenediamine, was used as the liquid deodorant.

Example 11

Carried out in the same manner as in Example 4, except that in the preparation of the solid deodorant, an aqueous solution (pH=7) containing 3 wt % of aminooxyacetic acid and 3 wt % of piperazine, was used as the liquid deodorant.

Comparative Example 5

Carried out in the same manner as in Example 4, except that in the preparation of the solid deodorant, the liquid deodorant was not used.

Comparative Example 6

Carried out in the same manner as in Example 4, except that in the preparation of the solid deodorant, the liquid deodorant prepared in Comparative Example 1 was used.

Comparative Example 7

Carried out in the same manner as in Example 4, except that in the preparation of the solid deodorant, an aqueous solution containing 3 wt % of aminooxyacetic acid (adjusted to pH=7 by adding sodium bicarbonate), was used as the liquid deodorant.

The results in Examples 4 to 11 and Comparative Examples 5 to 7 are shown in Table 2. As is evident from Table 2, the deodorants of the present invention exhibited higher aldehyde capture performance as compared to conventional deodorants.

TABLE 2

| | Liquid deodorant | | | Aldehyde capture rate [%] | | | | | |
|---|---|---|---|---|---|---|---|---|---|
| | Composition [wt %] | pH | FA | AA | PA | BA | VA | i-VA |
| Ex. 4 | Aminooxyacetic acid [3], polyethyleneimine [3], water [94] | 7 | >99 | 94 | 94 | 95 | 95 | 96 |
| Ex. 5 | Aminooxyacetic acid [3], tris-hydroxymethylaminomethane [4], water [93] | 7 | >99 | 93 | 90 | 90 | 91 | 88 |
| Ex. 6 | Aminooxyacetic acid [3], triethanolamine [5], water [92] | 7 | >99 | 65 | 69 | 73 | 79 | 82 |
| Ex. 7 | Aminooxyacetic acid [3], ethylenediamine-N,N,N',N'-tetraethanol [4], water [93] | 7 | >99 | 66 | 71 | 76 | 81 | 84 |
| Ex. 8 | Aminooxyacetic acid [3], 1,4-piperazine diethanol [6], water [91] | 7 | >99 | 65 | 68 | 73 | 77 | 80 |
| Ex. 9 | Aminooxyacetic acid [3], 1-(2,3-dihydroxypropyl)piperazine [5], water [92] | 7 | >99 | 64 | 68 | 72 | 77 | 79 |
| Ex. 10 | Aminooxyacetic acid [3], 2-hydroxymethyltriethylenediamine [4], water [93] | 7 | >99 | 64 | 68 | 72 | 76 | 79 |
| Ex. 11 | Aminooxyacetic acid [3], piperazine [3], water [94] | 7 | >99 | 65 | 68 | 72 | 77 | 79 |
| Comp. Ex. 5 | Nil | — | 96 | 7 | <5 | 6 | 11 | 7 |
| Comp. Ex. 6 | Adipic acid dihydrazide [5], water [95] | 8 | 99 | 58 | 32 | 34 | 52 | 32 |
| Comp. Ex. 7 | Aminooxyacetic acid [3], water + NaHCO$_3$ to adjust pH to be 7 | 7 | 99 | 20 | 11 | 15 | 15 | 27 |

Capture Test of Carboxylic Acid Using Solid Deodorant

Example 12

The solid deodorant prepared in Example 4 was sealed in a Tedlar bag and degassed under reduced pressure, and then, 1 L of an acetic acid gas at a concentration of 25 mg/m$^3$ was injected. After being left to stand at room temperature for 30 minutes, the acetic acid concentration in the Tedlar bag was quantified by a gas detector tube (manufactured by GASTEC). Further, the acetic acid capture rate was calculated from the following formula.

Capture rate[%]={(initial concentration−remaining concentration)/initial concentration}×100.

Example 13

Carried out in the same manner as in Example 12, except that a solid deodorant obtained in the same manner as in Example 4 using the liquid deodorant prepared in Example 2, was used.

Comparative Example 8

Carried out in the same manner as in Example 12, except that in the preparation of the solid deodorant, an aqueous solution (pH=3) containing 3 wt % of aminooxyacetic acid, was used as the liquid deodorant.

The results in Examples 12 to 13 and Comparative Example 8 are shown in Table 3. As is evident from Table 3, the deodorants of the present invention showed higher carboxylic acid capturing performance as compared to the conventional deodorant.

TABLE 3

| | Liquid deodorant | | Acetic acid capture rate [%] |
|---|---|---|---|
| | Composition [wt %] | pH | |
| Ex. 12 | Aminooxyacetic acid [3], polyethyleneimine [3], water [94] | 7 | >97 |
| Ex. 13 | Aminooxyacetic acid [3], polyethyleneimine [2], water [95] | 5 | 80 |
| Comp. Ex. 8 | Aminooxyacetic acid [3], water [97] | 3 | 50 |

Example 14

In 500 mL of the liquid deodorant prepared in Example 1, three aluminum specimens (alloy number=A1050, 30×20×2 mm) were immersed at room temperature for 1 week, followed by washing with water and brushing, whereby the corrosion rate was calculated from the weight change (average value of three specimens) before and after the immersion.

Example 15

Carried out in the same manner as in Example 14, except that instead of the aluminum specimens, brass specimens (alloy number=C3604) were used.

Comparative Example 9

Carried out in the same manner as in Example 14, except that as the liquid deodorant, an aqueous solution (pH=3) containing 3 wt % of aminooxyacetic acid, was used.

Comparative Example 10

Carried out in the same manner as in Example 15, except that as the liquid deodorant, an aqueous solution (pH=3) containing 3 wt % of aminooxyacetic acid, was used.

The results in Examples 14 to 15 and Comparative Examples 9 to 10 are shown in Table 4. As is evident from Table 4, the deodorants of the present invention were less metal corrosive as compared to conventional deodorants.

TABLE 4

| | Liquid deodorant | | Specimen | Corrosion |
|---|---|---|---|---|
| | Composition [wt %] | pH | (alloy number) | rate [mm/y] |
| Ex. 14 | Aminooxyacetic acid [3], polyethyleneimine [3], water [94] | 7 | Aluminum (A1050) | 0.027 |
| Ex. 15 | | | Brass (C3604) | 0.012 |
| Comp. Ex. 9 | Aminooxyacetic acid [3], water [97] | 3 | Aluminum (A1050) | 0.582 |
| Comp. Ex. 10 | | | Brass (C3604) | 0.126 |

In the foregoing, the present invention has been described in detail with reference to specific embodiments, but, it is apparent to those skilled in the art that various changes and modifications can be made without departing from the essence and scope of the present invention.

The entire disclosures of Japanese Patent Application No. 2020-017851, filed on Feb. 5, 2020, and Japanese Patent Application No. 2020-116634, filed on Jul. 6, 2020 including specifications, claims, drawings and summaries are incorporated herein by reference in their entireties.

INDUSTRIAL APPLICABILITY

The deodorant of the present invention rapidly captures aldehydes and carboxylic acids. As a result, the odor derived from aldehydes and carboxylic acids can be reduced, and the human living environment can be improved.

The invention claimed is:

1. A deodorant, comprising:
a carboxy group-containing O-substituted monohydroxylamine or a chemically acceptable salt thereof,
wherein the carboxy group-containing O-substituted monohydroxylamine is a compound of the following formula (1):

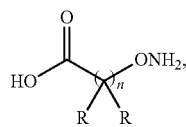

(1)

wherein R is a hydrogen atom, and n is 1,
an amine, wherein the amine is at least one member selected from the group consisting of polyethyleneimine, triethanolamine, tris-hydroxymethylaminomethane, ethylenediamine-N,N,N',N'-tetraethanol, 1,4-piperazine diethanol, and 2-hydroxymethyltriethylenediamine, and water as a solvent,
wherein a pH of the deodorant is from 5 to 9.

2. A deodorizing method, comprising removing odorants by applying the deodorant of claim 1.

3. The deodorizing method according to claim 2, wherein the odorants are aldehydes.

4. The deodorizing method according to claim 2, wherein the odorants are carboxylic acids.

5. The deodorant according to claim 1, wherein the deodorant is used as a liquid deodorant, and wherein an amount of the carboxy group-containing O-substituted monohydroxylamine and the amine dissolved in the water is from 0.01 wt % to 30 wt % based on the total content of the deodorant.

6. The deodorant according to claim 1, wherein the deodorant is used as a solid deodorant, wherein the carboxy group-containing O-substituted monohydroxylamine and the amine are physically adsorbed and fixed on a water-insoluble carrier, and the water is remove.

7. The deodorant according to claim 6, wherein the water-insoluble carrier is a polymer carrier.

8. The deodorant according to claim 6, wherein a shape of the carrier is spherical, particulate, fibrous, granular, monolithic columnnar, hollow fibrous, or membranous.

9. The deodorant according to claim 8, wherein the carrier is a spherical, particulate or granular carrier, and has an average particle size of from 1 μm to 10 mm.

10. The deodorant according to claim 8, wherein the carrier is a spherical, particulate or granular carrier, and has an average particle size of from 2 μm to 1 mm.

11. The deodorant according to claim 8, wherein the carrier has an average pore size of from 1 nm to 1 μm.

12. The deodorant according to claim 8, wherein the carboxy group of the carboxy group-containing O-substituted monohydroxylamine forms an intramolecular salt with an intramolecular hydroxylamino group.

* * * * *